INVENTOR
ROBERT P. SOMERVILLE
BY N. Friedman
ATTORNEY

Oct. 13, 1970     R. P. SOMERVILLE     3,533,647
CARRIAGE MECHANISM
Filed Dec. 14, 1966     2 Sheets-Sheet 2
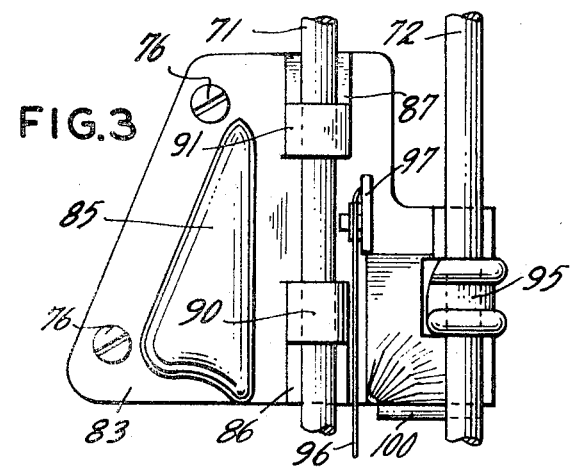
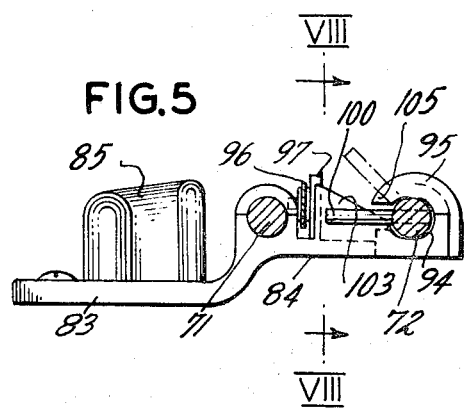
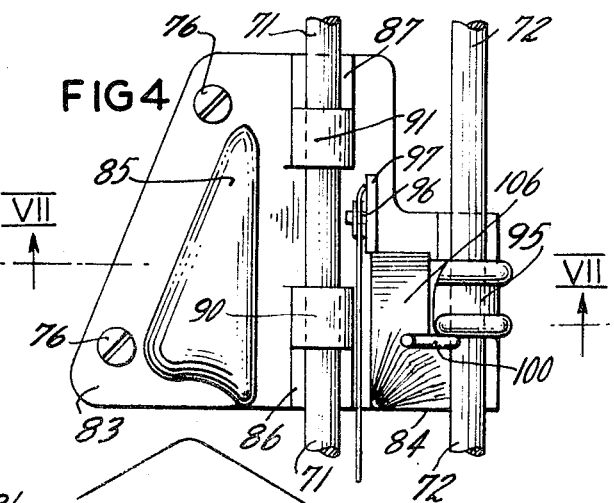
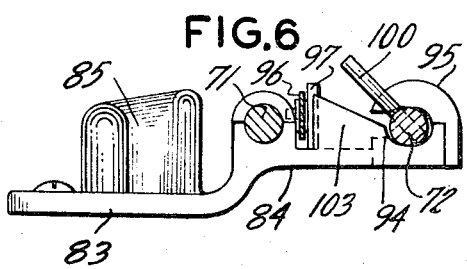
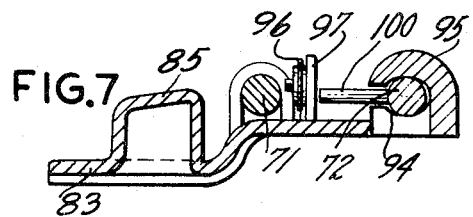
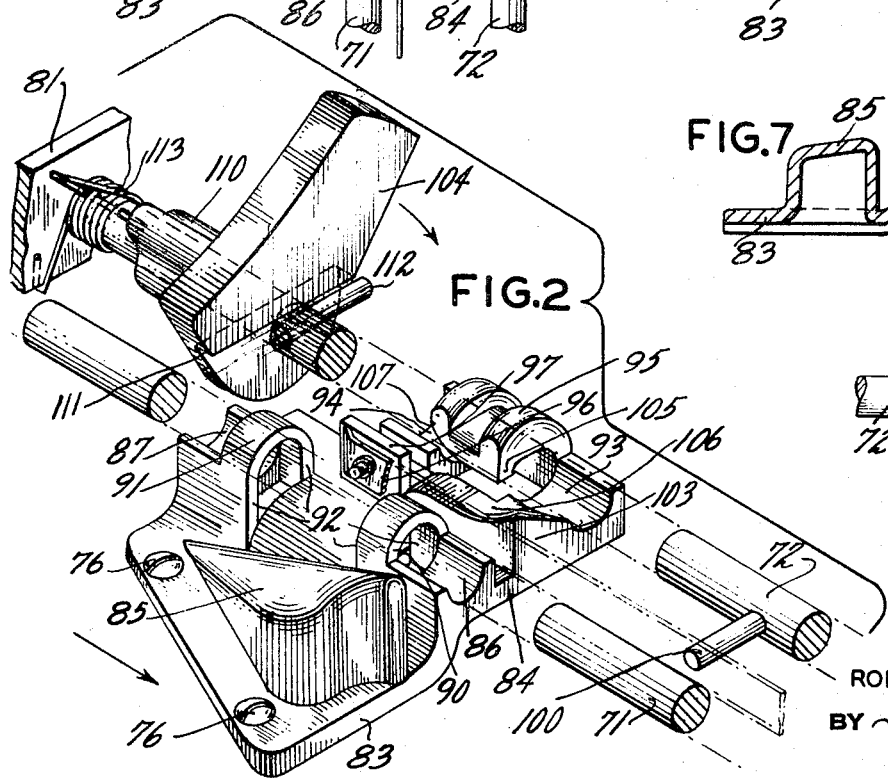
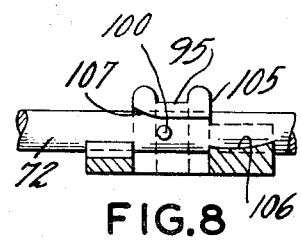
INVENTOR
ROBERT P. SOMERVILLE
BY N. Friedman
ATTORNEY United States Patent Office 3,533,647
Patented Oct. 13, 1970

3,533,647
CARRIAGE MECHANISM
Robert P. Somerville, Toronto, Ontario, Canada, assignor to Litton Business Systems of Canada Ltd., Toronto, Ontario, Canada, a Dominion company of Canada
Filed Dec. 14, 1966, Ser. No. 601,678
Int. Cl. B41l 3/10
U.S. Cl. 282—29     17 Claims

ABSTRACT OF THE DISCLOSURE

A carriage shiftable in opposite directions on a posting board for shifting a first record sheet carried by the carriage relative to a second record sheet supported on the board. Movable stop members are provided to block carriage movement in one direction and means is provided responsive to shifting movement of the carriage in the opposite direction to remove the stop members from the shifting path of the carriage.

---

This invention pertains to shiftable carriages. Although intended primarily for use in a posting board of the type shown in U.S. Pat. No. 2,828,977, the various principles and features of the invention are applicable to numerous other types of carriages.

Prior art carriage mechanisms have been relatively complex, and therefore expensive to manufacture. Not only do they involve a large number of separate parts, but also parts which move relative to one another to control the shifting of the carriage. Shifting is usually performed in two steps to prevent an unintended shift of the carriage beyond its next intended position. For this purpose, the carriage usually includes various rockable dogs or pawls.

The present invention provides a greatly simplified form of carriage in which all moving parts thereof have been eliminated. Thus, service problems are greatly minimized since there are no moving parts to wear out. Further, the manufacturing costs of the carriage are greatly reduced. In fact, in a preferred embodiment as shown herein, the carriage can be formed as one single integral plastic molded unit.

As a further feature of the invention, the guide rail means on which the carriage is mounted for shifting movement incorporates the shift control means for determining the various stopped shifted positions of the carriage.

It is therefore a principal object of the invention to provide a simplified carriage mechanism.

It is a further object to eliminate moving parts from a carriage.

It is a further object to provide a carriage which can be manufactured at much lower cost then previous carriages.

It is a further object to provide a carriage which can be formed as one integrally molded or cast article.

It is a further object to provide a novel carriage mechanism for a posting board device.

Other objects, advantages, and features of the invention will be apparent to those skilled in the art from a reading of the following detailed description in conjunction with the accompanying drawings, wherein:

FIG. 2 is a fragmentary, enlarged, exploded, perspective, detail view of the carriage mechanism;

FIG. 3 is a top plan detail view of the carriage in its normal position;

FIG. 4 is a view similar to FIG. 3 showing the carriage shifted a partial step of movement;

FIGS. 5 and 6 are side elevation views of FIGS. 3 and 4, respectively;

FIG. 7 is a section taken on line VII—VII of FIG. 4; and,

FIG. 8 is a fragmentary sectional view of the carriage taken on line VIII—VIII of FIG. 5.

POSTING BOARD

Figure 1:
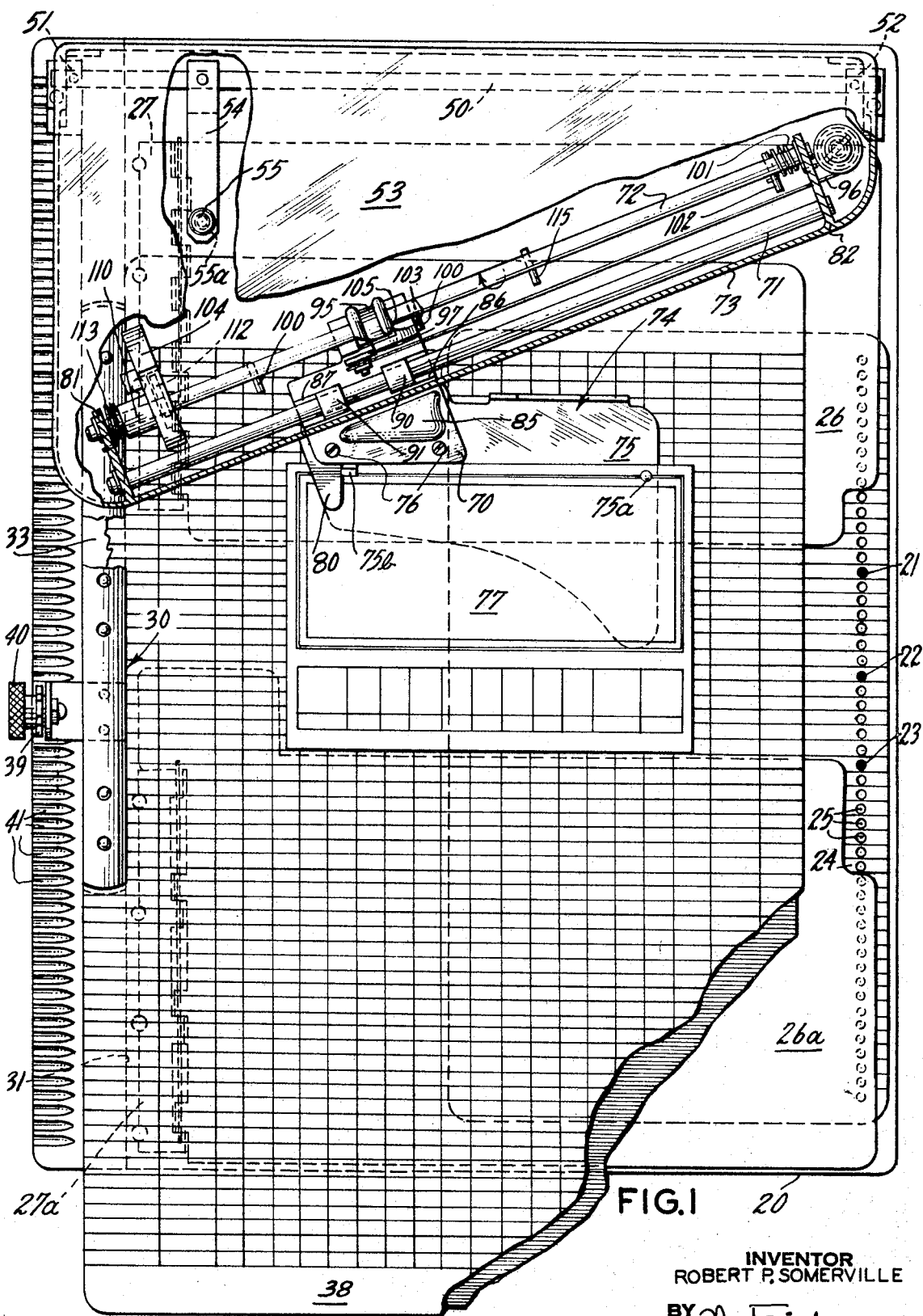
FIG. 1 is a top plan view of a posting board in which the novel carriage mechanism of the invention can be incorporated.

The novel carriage mechanism is disclosed herein incorporated in a posting board of the type shown in U.S. Pat. No. 2,828,977 granted Apr. 1, 1958 in the name of E. H. Doerner. To the extent practical, like parts of the presently disclosed device and that of the aforementioned patent will be designated by like reference numerals.

The reference numeral 20 indicates a flat board member adapted to be supported on a desk or table top by any suitable supporting means (not shown) affixed to the underside of the board. Three pins 21, 22, 23 are affixed to the board 20 adjacent the right-hand edge thereof at vertically spaced points. The center pin 22 of the three pins is of a different color from the other two pins and serves as an indexing pin to indicate the posting line. An account card 24, having a plurality of holes 25 spaced vertically along the right-hand edge thereof, is adapted to lie on the upper surface of the board 20 with the three pins 21, 22, and 23 extending through three of the holes 25, there being one of the latter for each horizontal line of the card 24. When the card 24 is positioned on board 20, pin 22 is inserted through hole 25 of the last unposted line thereof thus automatically positioning the card for posting.

Shields 26 and 26a are hinged adjacent their left edges to respective plates 27 and 27a secured to board 20.

A journal holding assembly indicated generally as 30 is slidably mounted for fore and aft movement adjacent the left edge of board 20. It comprises a narrow elongated plate 33 which is slidably received in a slot 31 which extends the full length of the board along its left edge. Upstanding pins 37 of plate 33 extend through corresponding apertures of a journal sheet 38. The weight of an overlying apertured clamping plate 35, through which the pins 37 extend, serves to hold the journal sheet in place. The lower plate 33 is secured to any suitable means for moving the journal holding assembly 30 up and down, as for example a pinion 39 adapted to be manually rotated by a knob 40, the pinion meshing with rack teeth formed 41 along the left edge of board 20. The details of such a rack and pinion arrangement are shown in greater detail in U.S. Pat. No. 2,598,358 granted May 27, 1952 in the name of R. Connor.

A shaft 50 is supported by and above the board 20 adjacent and parallel to its upper end by brackets 51 and 52. A generally triangular housing 53 is rotatably supported by suitable journal means at the opposite ends of the shaft for rotation about the shaft as an axis. A forwardly extending arm 54 secured to shaft 50 has an upstanding screw 55 threaded in the forward end thereof. The enlarged head 55a of the screw serves as an adjustable stop for downward rotational movement of housing 53, so that the latter is normally disposed parallel to and spaced upwardly a slight distance from the surface of board 20.

A carriage 70 is slidably mounted on guide rails 71 and 72 for diagonal shifting movement in a direction parallel to the oblique forward edge 73 of housing 53. Check holding means 74 is secured to carriage 70. The check holding means comprises a plate 75 secured to the forward portion of the carriage by screws 76. A check 77 is held on plate 75 by a pin 75a of the plate extending through a corresponding aperture in the check; and a spring finger 80 which clamps the check against the plate. The upper edge of the check is aligned in proper position by abutting against an upstanding lug 75b of plate 75.

The manner of use of such a posting board as described above is well known, and is further set forth in detail in columns 5 and 6 of the aforementioned U.S. Pat. No. 2,828,997. It will suffice here to say that the board is used for collating several forms; for example a payroll ledger and a journal sheet whereon entries are made horizontally across, and an itemized check stub. The tabulating carriage 70 serves to shift the check to its various posting positions.

CARRIAGE MECHANISM

The novel carriage mechanism of the invention will now be described in detail. As stated earlier, although a primary intended application of the carriage mechanism is in a posting board of the general type shown in U.S. Pat. No. 2,828,977, various principles and features of the invention are applicable to carriages in general, irrespective of the particular field in which the carriage is employed.

As best seen in FIGS. 2–8, in the preferred embodiment shown herein the carriage comprises a single unitary integral molded or cast article, made for example of a suitable synthetic resin such as the material sold by Du Pont under the trademark "Delrin." However, if desired it could be made of separate parts secured together.

The carriage is slidably supported for shifting movement on the aforementioned guide rail shafts 71 and 72. The latter are supported at their respective opposite ends in framing plates 81 and 82 (FIG. 1) integral with the underside of housing 53. Shaft 71 is rigidly held stationary, while shaft 72 is journalled for rotation in the framing plates to control shifting tabulating movement of the carriage as will be described shortly.

The carriage 70 comprises a front portion 83 and an upwardly offset rear portion 84 integral therewith. The forward portion includes a manually engageable handle or finger piece 85 in the form of an upstanding, hollow, integral, generally triangular-shaped member which tapers in thickness from right to left as viewed from the front.

Immediately behind finger piece 85, the rear portion of the carriage includes means by which the carriage is mounted for shifting movement on the forward guide rail or shaft 71. This means includes two spaced aligned downwardly concave cradles 86, 87 of semicircular cross section closely fitting the bottom half of shaft 71. The cradles are respectively disposed on opposite sides of the carriage. Inwardly of and integrally contiguous with each of the cradle portions 86, 87 are respectively spaced semicircular half sleeve portions 90, 91. The inner surface of each such sleeve portion is adapted to closely fit over the upper half of shaft 71. The inner surface of both sleeve portions has the same radius and center of curvature as the concave surface of the semicircular cradle portions 86, 87. Thus, the carriage is mounted on shaft 71 for shifting movement therealong in both directions by cradles 86 and 87, which embrace the lower half of the shaft, and by sleeves 90 and 91, which embrace the upper half of the shaft. Integral upstanding walls 92 connect the half sleeves 90, 91 to the adjacent underlying portions of the carriage.

The carriage structure by which it is shiftably mounted on the rear, rotatable guide rail or shaft 72 includes two spaced aligned integral downwardly concave cradle portions 93, 94. Between and integrally contiguous to the latter, the carriage includes a raised forward overhanging partial tubular or sleeve 95 portion which embraces the upper portion of shaft 72. Thus, the carriage is mounted on shaft 72 for shifting movement therealong by cradles 93 and 94, which embrace the lower portion of the shaft, and by sleeve 95, which embraces the upper portion of the shaft.

The carriage is at all times urged to the right by a flat torsion shifting spring 96, whose left-hand free end is fastened in any suitable manner to an integral upstanding lug 97 of the carriage. The coiled portion of spring 96 is mounted in the right-hand end of housing 53.

As was mentioned earlier, the rear carriage guide shaft 72 is rockable for controlling shifting movement of the carriage. The carriage is held blocked in its various shifted positions against the urge of spring 96 by a number of stop pins 100 carried by shaft 72. The stop pins 100 can be press fitted into shaft 72. Alternatively, the shaft can be provided with a number or threaded holes, and each pin provided with a threaded end and screwed into the holes at appropriate locations where it is desired to provide various stopped tabulated positions of the carriage.

A torsion spring 101 (FIG. 1) mounted on the right-hand end of shaft 72, normally biases the shaft and the pins 100 to the counterclockwise position shown in FIGS. 2, 3, 5, and 7. For this purpose, the opposite ends of this torsion spring are bent outwardly and respectively hooked under a pin 102 carried by the shaft and the right-hand framing plate 82 of housing 53. In this normal, counterclockwise position of shaft 72, the stop pins 100, which all extend outwardly from the shaft in substantially the same direction, lie substantially horizontal and in the path of an integral primary stop shoulder 103 of the carriage. The primary stop shoulder 103, as best seen in FIG. 2, is on the right-hand side of the carriage and lies just forwardly of the rear right-hand cradle 93. In this normal position of the parts, it will be seen therefore that the currently effective stop pin 100 blocks the carriage against rightward shifting movement by abutting shoulder 103.

When it is desired to shift the carriage, shaft 72 is rocked clockwise (FIGS. 5, 6) by manual depression of an operating crank 104 (FIGS. 1, 2) carried at the left-hand of the shaft. This clockwise movement of the currently effective stop pin 100 will swing the pin out of blocking relation with the primary stop shoulder 103, thereby allowing the carriage shifting spring 96 to move the carriage rightwardly on the guide rail shafts 71, 72.

However, the carriage could shift past the next adjacent rightward pin 100 which is intended to be effective, if the operator should hold shaft 72 rocked too long. To prevent this from happening, the carriage includes a secondary stop means in the form of a secondary stop shoulder 105. The latter is provided at the forward right-hand end portion of the tubular sleeve portion 95. The faces of the primary and secondary stop shoulders are, as shown, of such extent, relative to the rotated positions of the stop pins 100, that one or the other will always be in alignment with the stop pins regardless of the angular, rocked position of the latter. That is to say, when the currently effective stop pin 100 swings upwardly just past the primary stop shoulder 103, it now lies in the path of shifting movement of the secondary stop shoulder 105. Therefore, the carriage shifting spring 96 will now move the carriage to the right an intermediate step of movement until stop shoulder 105 comes up against the same pin, thereby halting the movement of the carriage.

When the operator now releases crank 104, the torsion return spring 101 will restore shaft 72 counterclockwise so that the stop pins once again lie horizontally and in the path of the carriage primary stop shoulder 103. In the course of this downward return rocking movement of the currently effective stop pin, it will move beneath and out of blocking relation with the secondary stop shoulder 105.

In this normalized position of the stop pins, no portion of the carriage to the left of the current pin is in longitudinal alignment (in the direction of shifting movement) with any portion of said pin. The forward downhanging free end portion of the sleeve portion 95 is spaced a sufficient distance above the underlying portion of the carriage to provide a longitudinal opening through which the pin passes (see FIG. 8) as the carriage shifting spring 96 now moves the carriage through the second and final intermediate step of movement until the carriage is halted by the primary stop shoulder 103 coming into abutment with the next right-hand stop pin 100. In this second intermediate step of movement, after the sleeve portion 95 passes above stop pin 100, the remaining carriage portions to the left thereof will pass beneath the stop pin out of contact therewith.

When it is desired to return the carriage leftward to any selected tabulated position, the operator merely grasps the integral triangular fingerpiece 85 at the front of the carriage and moves the carriage to the left. In the course of this leftward return movement, each successive stop pin 100 will be cammed upwardly by integral cam means provided on the carriage to clear the primary stop shoulder 103, and will then drop down in front thereof, the pins being under the counterclockwise bias exerted on shaft 72 by the torsion spring 101. This cam means comprises an upwardly, forwardly sloping cam surface 106 disposed as best seen in FIG. 2. The right-hand end of cam surface 106 terminates at the upper edge of the primary stop shoulder 103. Accordingly, as the carriage is being restored to the left past each stop pin 100, cam surface 106 will rock the pin upwardly, and the latter will then drop down in front of the stop shoulder.

An upwardly and leftwardly sloping cam surface 107 (FIGS. 2, 8) is also provided on the left underside portion of sleeve portion 95. If by any chance the rock shaft is held in its clockwise rocked position when the carriage is being restored to the left, this cam surface 107 will rock the pin, and shaft 72 therewith, downwardly to its normal counterclockwise position to permit the carriage to be shifted leftwardly past the pin.

The aforementioned manual operating crank 104 for shaft 72 is mounted and operates as follows. As best seen in FIGS. 1 and 2, the shaft loosely passes through the crank and an integral leftward hub 110 extension of the latter. An undercut shoulder 111 of the crank overlies a pin 113 fixed to the shaft. A torsion spring 113 loosely wrapped around the left end of shaft 72 has one end thereof hooked underneath the left-hand framing plate 81 of housing 53. The other end of the spring is laterally bent and is received in an aperture of hub extension 110. Torsion spring 113 normally biases the crank counter-clockwise (FIG. 2) as limited by a lug 114 of the crank abutting the underside of housing 53. The torsion spring 101 at the right-hand end of shaft 72 biases the shaft counterclockwise, as limited by pin 112 abutting the crank shoulder 111. When crank 104 is operated by being pushed downwardly, i.e., rocked clockwise, like movement is imparted to shaft 72 by shoulder 111 engaging pin 112.

The extreme rightmost shifted position of the carriage 70 is determined by providing shaft 72 with a limit pin 115 (FIG. 1) like pins 100 but which also protrudes beyond the rear of the shaft. Pin 115 will therefore be in the path of the right-hand end vertical face of cradle 93 when shaft 72 is rocked to its clockwise operated position of FIG. 6. Therefore, regardless of the rocked position of shaft 72, pin 115 will at all times block the carriage against rightward movement past this pin.

It will be seen from the foregoing detailed description that there has been provided a greatly simplified carriage mechanism which is simple and inexpensive to fabricate and which has no moving parts. Although the carriage has been shown in one particular embodiment, and also in a particular environment, namely a posting board, it will be understood that the foregoing detailed disclosure is for exemplary purposes only. The novel principles of the carriage can be employed in other embodiments. The carriage can be used with other types of posting boards, and further is not even restricted to use with posting boards but can be used for carriages in other arts.

Accordingly, it is intended that the foregoing detailed disclosure be illustrative only and not in any way limitative of the following claims.

I claim:

1. Carriage mechanism comprising:

a shiftable carriage mounted for shifting movement in a given and opposite directions;

shift control means for controlling shifting movement of said carriage;

said shift control means comprising a plurality of stop members;

means mounting said stop members for rotational movement;

said carriage including stop means for abutting any selected one of said stop members when said stop members are in a given angular position such that said stop members are positioned in the shifting path of said stop means to block said carriage against shifting movement in said given direction;

means for maintaining said stop members normally in said given angular position;

means for rotating said stop members to another angular position to remove said stop members from the shifting path of said stop means; and means responsive to shifting movement of said carriage in said opposite direction to rotate said stop members from said given angular position to said another angular position.

2. The combination according to claim 1, wherein: said last-mentioned means is a portion of said carriage.

3. The combination according to claim 2, wherein: said last-mentioned means comprises cam means.

4. The combination according to claim 3, wherein: said cam means is a rigid immovable portion of said carriage.

5. The combination according to claim 4, wherein: said stop members all extend in substantially the same angular direction.

6. The combination according to claim 5, wherein: said means mounting said stop members for rotational movement comprises a rotatable shaft on which said stop members are mounted for rotation therewith.

7. The combination according to laim 6, wherein: said carriage is mounted on said rotatable shaft for shifting movement therealong.

8. The combination according to claim 7, including: a second shaft, on which said carriage is mounted for shifting movement therealong.

9. The combination according to claim 4, wherein: said carriage includes a second stop means spaced from said first stop means in said opposite direction; said stop members lying in the path of said second stop means when they are in said another angular position and lying out of the path of said second stop means when they are in said given angular position.

10. The combination according to claim 9, wherein: both said stop means are rigid, immovable portions of said carriage.

11. The combination according to claim 10, wherein: said carriage, including said cam means and both said stop means, is of intergal, one-piece construction.

12. In a posting board device:

a board adapted to support at least one form;

means for holding said form on said board;

means for carrying a second form;

a shiftable carriage to which said carrying means is attached for movement therewith, for shifting said second form relative to said first form;

said shiftable carriage being mounted for movement relative to said board in a given and opposite directions;

shift control means for controlling shifting movement of said carriage;

said shift control means comprising a plurality of stop members;

means mounting said stop members for rotational movement;

said carriage including stop means for abutting any selected one of said stop members when said stop members are in a given angular position so that said stop members are positioned in the shifting path of said stop means to block said carriage against shifting movement in said given direction;

means for maintaining said stop members normally in said given angular position;

means for rotating said stop members to another angular position to remove said stop members from the shifting path of said stop means; and means responsive to shifting movement of said carriage in said opposite direction to rotate said stop members from said given angular position to said another angular position.

13. The combination according to claim 12, wherein: said last-mentioned means comprises cam means, said cam means being a rigid, immovable portion of said carriage.

14. Carriage mechanism comprising:

a shiftable carriage mounted for shifting movement in a given and opposite directions;

shift control means for controlling shifting movement of said carriage;

said shift control means comprising a plurality of stop members;

means mounting said stop members for movement between effective and ineffective positions;

said carriage including stop means for abutting any selected one of said stop members when said stop members are in effective position so that said stop members are positioned in the shifting path of said stop means to block said carriage against shifting movement in said given direction;

means for maintaining said stop members normally in said effective position;

means for moving said stop members to ineffective position to remove said stop members from the shifting path of said stop means; and means responsive to shifting movement of said carriage in said opposite direction to move said stop members from effective to ineffective position.

15. The combination according to claim 14, wherein: said last-mentioned means is a portion of said carriage.

16. The combination according to claim 15, wherein:: said last-mentioned means comprises cam means.

17. The combination according to claim 16, wherein: said cam means is a rigid immovable portion of said carriage.

References Cited

UNITED STATES PATENTS

| | | | |
|---|---|---|---|
| 537,098 | 4/1895 | Yost | 197—86 |
| 543,111 | 7/1895 | Spiro | 197—176 |
| 1,570,153 | 1/1926 | Horrell | 54—503 |
| 2,828,977 | 4/1958 | Doerner. | |

FOREIGN PATENTS

| | | |
|---|---|---|
| 591,934 | 2/1960 | Canada. |

EUGENE R. CAPOZIO, Primary Examiner

U.S. Cl. X.R.

197—86, 176

UNITED STATES PATENT OFFICE
CERTIFICATE OF CORRECTION

Patent No. 3,533,647  Dated October 13, 1970

Inventor(s) Robert P. Somerville

It is certified that error appears in the above-identified patent and that said Letters Patent are hereby corrected as shown below:

In column 3, line 9, "2,828,997" should read --2,828,977--

In column 5, line 44, in the first occurrence "113" should read --112--

In column 6, line 47, "laim" should read --claim--

Signed and sealed this 25th day of May 1971.

(SEAL)
Attest:

EDWARD M. FLETCHER, JR.
Attesting Officer

WILLIAM E. SCHUYLER, JR.
Commissioner of Patents